| | |
|---|---|
| (12) United States Patent <br> Uchiyama | (10) Patent No.: US 9,106,148 B2 <br> (45) Date of Patent: Aug. 11, 2015 |

(54) POWER SUPPLY APPARATUS AND IMAGE FORMING APPARATUS

(71) Applicant: CANON KABUSHIKI KAISHA, Tokyo (JP)

(72) Inventor: Nobuyuki Uchiyama, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/546,588

(22) Filed: Nov. 18, 2014

(65) Prior Publication Data

US 2015/0147080 A1    May 28, 2015

(30) Foreign Application Priority Data

Nov. 27, 2013    (JP) ................................. 2013-245244

(51) Int. Cl.
```
G03G 15/00    (2006.01)
H02M 3/338   (2006.01)
H02M 1/08    (2006.01)
H02M 1/00    (2007.01)
```
(52) U.S. Cl.
CPC ......... H02M 3/3385 (2013.01); G03G 15/5004 (2013.01); G03G 15/80 (2013.01); H02M 1/08 (2013.01); H02M 2001/0048 (2013.01)

(58) Field of Classification Search
CPC ...... G03G 15/80; G03G 15/5005; H02M 3/28

USPC .......................................... 363/15; 399/88, 89
See application file for complete search history.

(56) References Cited

U.S. PATENT DOCUMENTS

| | | | |
|---|---|---|---|
| 7,639,516 B2 | 12/2009 | Usui et al. | |
| 2011/0311259 A1* | 12/2011 | Hayasaki et al. | ............... 399/88 |
| 2012/0301172 A1 | 11/2012 | Odate et al. | |
| 2013/0236203 A1* | 9/2013 | Nakajima et al. | ............... 399/88 |

FOREIGN PATENT DOCUMENTS

| | | |
|---|---|---|
| JP | 2000-184709 A | 6/2000 |
| JP | 2003-299356 A | 10/2003 |

* cited by examiner

*Primary Examiner* — Hoang Ngo (74) *Attorney, Agent, or Firm* — Fitzpatrick, Cella, Harper & Scinto (57) ABSTRACT

The power supply apparatus includes a transformer having primary and secondary sides, a switching element, a feedback unit, a conversion unit that converts a current flowing in a primary winding of the transformer into a voltage, a control unit that controls operation of the switching element, a voltage switching unit that increases the voltage output from the conversion unit and feeds the increased voltage to the control unit when a continuous oscillation state is transited to an intermittent oscillation state. The voltage switching unit switches the voltage of the power supply that is input into the control unit to be higher when the continuous oscillation state is transited to the intermittent oscillation state.

13 Claims, 5 Drawing Sheets

POWER SUPPLY APPARATUS AND IMAGE FORMING APPARATUS

BACKGROUND OF THE INVENTION

1. Field of the Invention

The present invention relates to a power supply apparatus and an image forming apparatus, and more particularly relates to a switching power supply which reduces a sound in an audible range generated by a transformer during light load operation.

2. Description of the Related Art

Figure 5A:
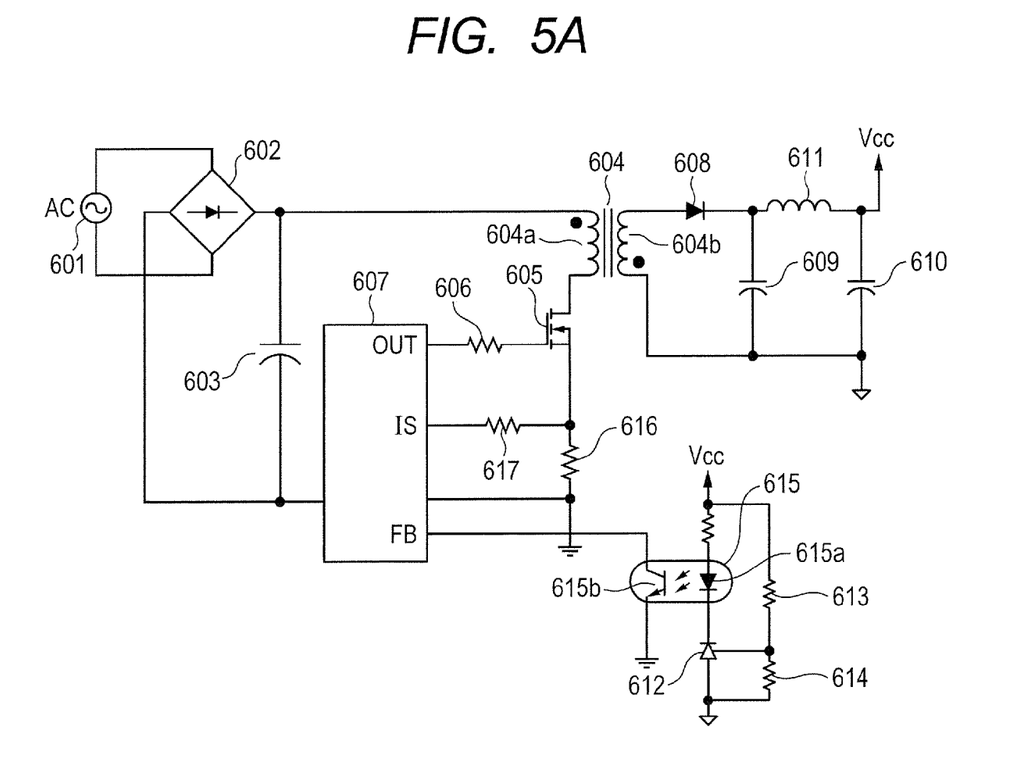
Figure 5B:
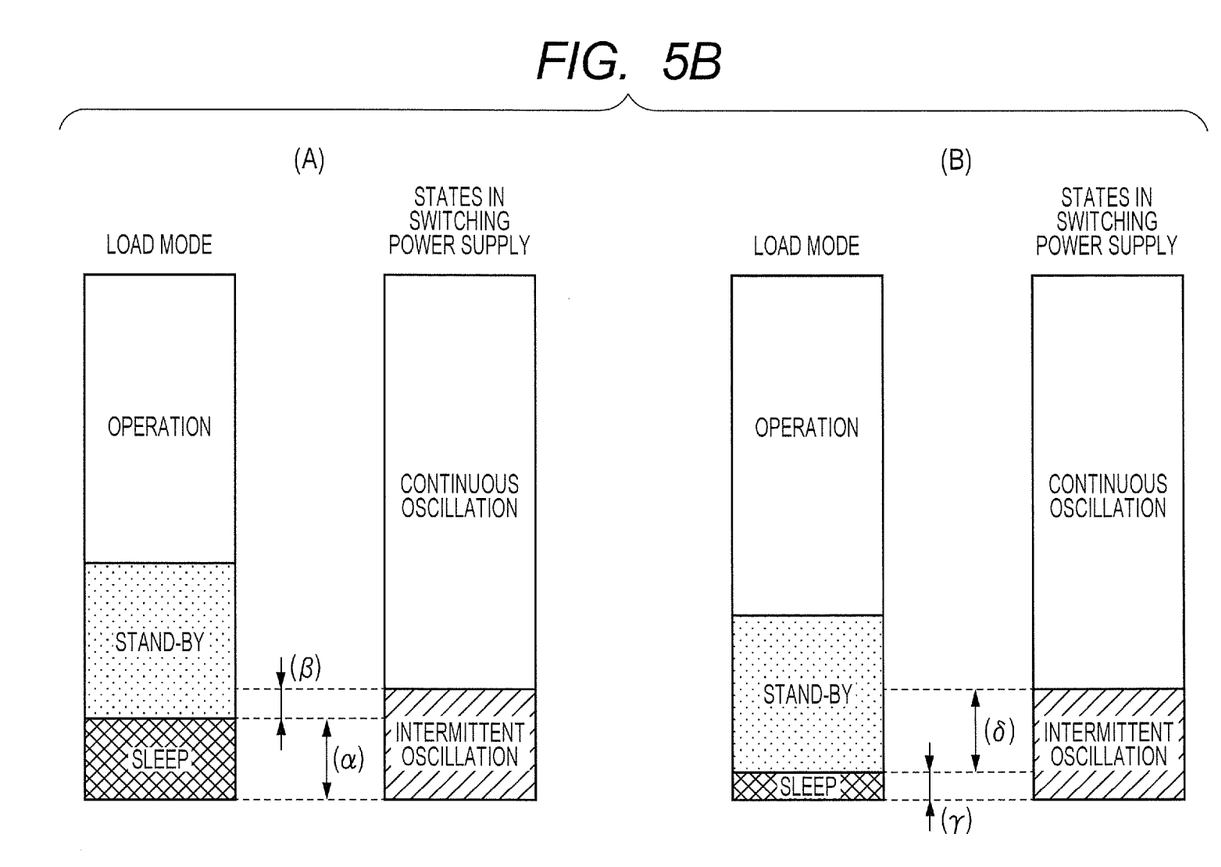
FIG. 5B is a concept view illustrating the relationship between the state of the switching power supply and the load mode.

FIG. 5A illustrates an example of a switching power supply. When a load becomes light, the switching power supply is controlled so that a switching element is driven in an intermittent oscillation state to reduce power consumption. FIG. 5A will be described later in detail in Description of the Embodiments. It is known that a sound is generated from the transformer when a cycle or a high frequency component of intermittent oscillation of the switching power supply enters into an audible range. While the switching power supply of an electronic apparatus operates in the intermittent oscillation state, a dominant load mode (load state) of the electronic apparatus is a sleep mode. In a stand-by mode, the intermittent oscillation state is supported in a range which is very low as the load state (which is close to the sleep mode). FIG. 5B is a concept view illustrating the state of the switching power supply corresponding to the load mode of the electronic apparatus. The load mode of the electronic apparatus includes, for example, an operation mode, a stand-by mode and a sleep mode. The state of the switching power supply includes a continuous oscillation state and an intermittent oscillation state. In the operation mode, the electronic apparatus is executing operation, while in the stand-by mode, the electronic apparatus is waiting for an operation instruction without executing any operation (is ready for executing operation). In the sleep mode, the electronic apparatus is in an energy saving state in which supply of electric power is partially stopped. (A) in FIG. 5B is a concept view illustrating the state of a conventional switching power supply, in which a ratio ($\alpha$) of the sleep mode is considerably larger than a ratio ($\beta$) of the stand-by mode in the intermittent oscillation state. Accordingly, as a countermeasure against sound generation by the transformer during light load operation, a signal indicative of the sleep mode is transmitted from a control unit of the electronic apparatus to the switching power supply. By using the signal indicative of the sleep mode as a trigger, the switching element is controlled so as to have a turn-on width forcibly narrowed (see, for example, Japanese Patent Application Laid-Open No. 2000-184709).

However, in recent years, power consumption of electronic apparatuses becomes much lower than before. Under the influence of the lowered power consumption, the stand-by mode becomes more dominant than the sleep mode as the load mode that supports the intermittent oscillation state of the switching power supply. Accordingly, sound generation by the transformer is more noticeable in the stand-by mode than in the sleep mode. (B) in FIG. 5B is a concept view illustrating the state of a recent switching power supply, in which a ratio ($\gamma$) of the sleep mode is considerably smaller than a ratio ($\delta$) of the stand-by mode in the intermittent oscillation state. In the past, the control unit of the electronic apparatus has performed a countermeasure against the sound generation by the transformer by using as a trigger the signal indicative of the sleep mode. However, it becomes more and more difficult to successfully perform the countermeasure. To cope with this situation, the countermeasure against sound generation may be performed on the entire load. However, this involves narrowing a turn-on width (turn-on time) of the switching element even in the operation mode that handles a heavy load. As a result, a driving frequency is increased even in the operation mode that handles the heavy load, which hinders reduction in power consumption and causes increase in switching noise.

SUMMARY OF THE INVENTION

The present inventions have been made under such circumstances, and an object of the present invention is to achieve reduction of a sound in the audible range generated from the transformer in the intermittent oscillation state of the switching power supply.

In order to accomplish the above object, it is to provide a power supply apparatus, including a transformer having a primary winding on a primary side and a secondary winding on a secondary side, a switching element configured to performs switching operation to turn on or turn off a current flowing in the primary winding, a feedback unit configured to output a voltage corresponding to a voltage generated in the secondary winding, a conversion unit configured to convert the current flowing in the primary winding of the transformer into a voltage, a control unit configured to control operation of the switching element based on the voltage output by the feedback unit and the voltage output from the conversion unit, and a voltage switching unit configured to increase the voltage output from the conversion unit and supply the increased voltage to the control unit, when the switching element is transited from a continuous oscillation state to an intermittent oscillation state, the continuous oscillation state causing the switching element to continuously oscillate in a predetermined cycle, the intermittent oscillation state causing the switching element to intermittently oscillate in a cycle longer than the predetermined cycle.

Further features of the present invention will become apparent from the following description of exemplary embodiments with reference to the attached drawings.

BRIEF DESCRIPTION OF THE DRAWINGS

FIG. 4A is a circuit diagram of a switching power supply of an embodiment 3, while

FIG. 5A is a circuit diagram of a switching power supply in a conventional example, while

DESCRIPTION OF THE EMBODIMENTS

Preferred embodiments of the present invention will now be described in detail in accordance with the accompanying drawings.

Hereinafter, the modes to implement the present invention will be described in detail based on embodiments with reference to the drawings.

[Conventional Switching Power Supply]

A conventional switching power supply circuit will be described with reference to FIG. 5A as a comparison for later-described embodiments. A voltage of an alternating current power supply 601 (simply referred to as AC in FIG. 5A) supplied from an electric socket is supplied to a diode bridge 602 via an unillustrated noise filter, and full wave rectification of the alternating voltage is performed. The voltage which is full-wave rectified by the diode bridge 602 is smoothed by an electrolytic capacitor 603 and supplied to a primary-side main winding (hereinafter simply referred to as a primary winding) 604a of a transformer 604. The transformer 604 has the primary winding 604a and a secondary winding 604b to provide insulation between a primary side and a secondary side. A gate terminal of a switching element (hereafter referred to as an FET) 605 is connected to an OUT terminal of a control IC 607 that is a control unit, via a resistor 606. A drain terminal of the FET 605 is connected to the other end (the side not marked with a black dot) of the primary winding 604a of the transformer 604. The control IC 607 performs ON-OFF control of the FET 605 in a predetermined cycle. When the FET 605 is turned on, current flows in the primary winding 604a of the transformer 604 and exciting energy is accumulated in the transformer 604. In this case, since the secondary winding 604b of the transformer 604 is wound in the direction opposite to the primary winding, a side of the secondary winding 604b marked with a black dot serves as an anode. In this case, a rectifying action by a rectifier diode 608 prevents the current flowing from the transformer 604 to the load side, so that a load current is fed from electrolytic capacitors 609 and 610. A choke coil 611 is provided in order to reduce a spike/ripple component of an output voltage.

When the FET 605 is turned off, the exciting energy accumulated in the transformer 604 is delivered to the secondary side. Accordingly, since the terminal opposite to the terminal marked with a black dot in the secondary winding 604b serves as an anode, the current flows to the load side via the rectifier diode 608 and the choke coil 611. The control IC 607 is configured to control the switching power supply. The control IC 607 has three terminals including an FB terminal, an IS terminal and an OUT terminal. The FB terminal of the control IC 607 is configured to receive input of a feedback voltage corresponding to an output voltage Vcc. The IS terminal is configured to receive input of a voltage converted from the current flowing through the FET 605. The OUT terminal is configured to output a pulse voltage to the gate terminal for driving the FET 605. A shunt regulator 612 compares a voltage obtained by dividing the output voltage Vcc by resistors 613 and 614 and a reference voltage inside the shunt regulator 612 so as to control the output voltage Vcc to be constant. For example, when the secondary-side load becomes heavy and the output voltage Vcc drops, the shunt regulator 612 reduces the amount of the current flowing through the inside so as to reduce the amount of the current flowing through a light emitting diode 615a in a photo coupler 615. Consequently, the current flowing to a photo-transistor 615b in the photo coupler 615 also decreases, so that the voltage of the FB terminal (hereinafter referred to as FB terminal voltage) in the control IC 607 rises. The FB terminal is pulled up inside the control IC 607. Thus, the shunt regulator 612 and the photo coupler 615 function as a feedback unit.

A resistor 616 that is a conversion unit is configured to perform voltage conversion of the current flowing through the FET 605. A drain current of the FET 605 which is voltage-converted in the resistor 616 is input into the IS terminal of the control IC 607 via a noise reduction resistor 617. The control IC 607 compares the voltages input into the FB terminal and the IS terminal, and detects that the voltage of the IS terminal (hereinafter referred to as IS terminal voltage) has reached the FB terminal voltage with an internal error amplifier not illustrated. When the control IC 607 detects that the IS terminal voltage has reached the FB terminal voltage, the control IC 607 sets an output from the OUT terminal at a low level and turns off the FET 605. Accordingly, when the load becomes heavy and the FB terminal voltage rises, the FET 605 is controlled so that the turn-on width is widened and is made to function to increase the lowered output voltage.

When the secondary-side load becomes light and the output voltage Vcc rises, the shunt regulator 612 increases the amount of the current flowing through the inside and thereby increases the amount of the current in the light emitting diode 615a of the photo coupler 615. Consequently, since the current flowing to the photo-transistor 615b of the photo coupler 615 also increases, the FB terminal voltage of the control IC 607 drops. As described in the foregoing, the control IC 607 compares the IS terminal voltage and the FB terminal voltage with the unillustrated internal error amplifier. At the moment when the IS terminal voltage matches with the FB terminal voltage, the control IC 607 sets the output from the OUT terminal at a low level and turns off the FET 605. Therefore, when the load becomes light and the FB terminal voltage drops, the FET 605 is controlled so that the turn-on width is narrowed and is made to function so as to decrease the raised output voltage.

When the FB terminal voltage becomes a predetermined voltage value or lower, the control IC 607 determines that the secondary-side load is sufficiently lowered. Accordingly, the control IC 607 controls the FET 605 in the intermittent oscillation state and thereby controls so that the power consumption of the FET 605 is extremely low. When the IS terminal voltage of the control IC 607 becomes a predetermined voltage or more, it is determined that the switching power supply is in an overload state. Accordingly, the output of the OUT terminal is set at a low level so as to control the switching operation of the FET 605 to be stopped. The threshold values of the FB terminal voltage and the IS terminal voltage are generally determined in the inside of the control IC 607 and are not changeable from the outside.

Embodiment 1

[Switching Power Supply]

Figure 1:
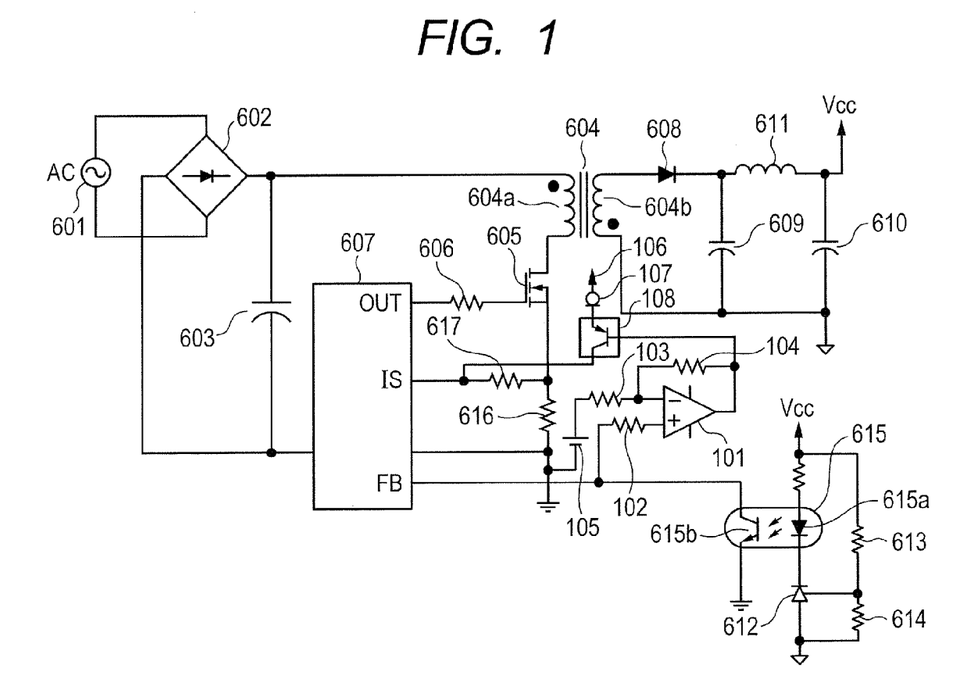
FIG. 1 is a circuit diagram of a switching power supply of an embodiment 1.
Figure 2:
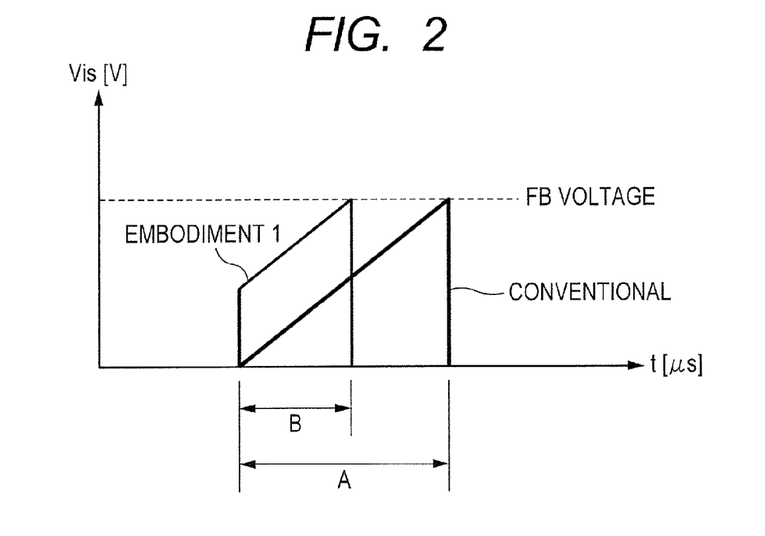
FIG. 2 illustrates the waveform of an IS terminal voltage of the embodiment 1.

FIG. 1 is a circuit diagram of a switching power supply that is a power supply apparatus of the embodiment 1. FIG. 2 illustrates an operation waveform of the switching power supply. The component members identical to those in FIG. 5A are designated with identical reference numerals to omit a description thereof. A comparator 101 has a non-inverting input terminal connected to an FB terminal of a control IC 607 via a resistor 102. The comparator 101 has an inverting input terminal that is connected to resistors 103 and 104, which are connected to a comparative voltage supply 105 and an output terminal of the comparator 101, respectively. The resistors 102 and 103 generally have resistance values selected to be identical to each other so that input impedance of the comparator 101 is uniform. The resistor 104 is configured to provide hysteresis to a comparison voltage of the comparator 101. The resistor 104 may be omitted on the theory of operation. A voltage (predetermined threshold value) of the comparative voltage supply 105 is set to be equal to a voltage value (a predetermined value, a specification value) used as a condition (also referred to as an intermittent oscillation condition) on which the FB terminal voltage of the control IC 607 transits to the intermittent oscillation state. The comparative voltage supply 105 is a stable voltage supply which is obtained by resistance-dividing the power supply voltage of the control IC 607 or by using a Zener diode. An auxiliary power supply 106 obtains a predetermined voltage value by rectifying and smoothing the voltage of an unillustrated auxiliary winding that is wound around the transformer 604 with an unillustrated diode and an unillustrated capacitor. In the case of FIG. 1, a constant current supply 107 includes a current regulative diode (CRD). A pnp type transistor (hereinafter simply referred to as a transistor) 108 is an element that feeds and blocks the current coming from the constant current supply 107.

In the switching power supply configured in this way, a voltage value input into the FB terminal of the control IC 607 is sufficiently larger than a voltage value (voltage value of the comparative voltage supply 105) that is the intermittent oscillation condition during a normal load operation. The normal load operation herein refers to the operation when the switching power supply is in the continuous oscillation state. Accordingly, the output of the comparator 101 is at a high level, and the transistor 108 maintains an OFF state, i.e., a cut off state. However, as the load gradually becomes lighter, the voltage value of the FB terminal voltage of the control IC 607 decreases, and the FB terminal voltage becomes lower than the voltage of the comparative voltage supply 105. That is, the voltage value input into the non-inverting input terminal of the comparator 101 becomes lower than the voltage value input into the inverting input terminal of the comparator 101, so that the output of the comparator 101 is switched to a low level. Once the output of the comparator 101 is switched to the low level, the transistor 108 is turned on, i.e., is electrically connected. Once the transistor 108 is electrically connected, the current from the constant current supply 107 flows to the resistors 617 and 616. Consequently, the voltage input into the IS terminal of the control IC 607 is incremented by a predetermined voltage, in other words, the predetermined voltage is added to the voltage of the IS terminal. The increment voltage is equivalent to a voltage generated on both the ends of a combined resistor made up of the resistors 617 and 616 connected in series. Since the IS terminal of the control IC 607 is in a high impedance state, the current of the constant current supply 107 does not flow through the IS terminal side of the control IC 607.

[Effect of Incrementing IS Terminal Voltage]

The waveform in FIG. 2 indicates change in IS terminal voltage of the control IC 607, in which an abscissa represents time t [μs] and an ordinate represents IS terminal voltage Vis [V] of the control IC 607. A dotted line in FIG. 2 represents a FB voltage, which is a voltage value (predetermined value, specification value) of the voltage of the comparative voltage supply 105, i.e., the FB terminal voltage used by the control IC 607 as a condition to execute transition to the intermittent oscillation state. The time A represents a period of time taken for the IS terminal voltage of the control IC 607 to reach the FB voltage during intermittent oscillation with a circuit of a conventional example illustrated in FIG. 5A. The time A is equivalent to the turn-on time of the FET 605. The time B is a period of time taken for the IS terminal voltage of the control IC 607 to reach the FB voltage during intermittent oscillation with a circuit of the present embodiment illustrated in FIG. 1. In the case of the time A in the conventional example, the IS terminal voltage of the control IC 607 starts to ascend from 0V when the load becomes light. Contrary to this, in the case of the time B of the present embodiment, when the load becomes light, the IS terminal voltage of the control IC 607 starts to ascend from the predetermined voltage value that has been corrected (incremented as described above). In other words, it can be said that the turn-on time of the FET 605 in the present embodiment is correction-controlled time B. Due to the current added by the constant current supply 107 (incremented voltage), the time B equivalent to the turn-on time of the FET 605 in the present embodiment is shorter in time taken for the IS terminal voltage to reach the FB voltage than the time A taken by the circuit of the conventional example. The control IC 607 controls the time taken for the IS terminal voltage to reach the FB terminal voltage as the driving time (turn-on time) of the FET 605. Accordingly, when the voltage input into the IS terminal is incremented, the driving time of the FET 605 is shortened.

In this way, the present embodiment may be configured to include a switch unit that performs switching operation to shorten the turn-on time of the FET 605 when the switching power supply transits from the continuous oscillation state to the intermittent oscillation state. Here, the switch unit includes the comparator 101 and the transistor 108. Since the peak value of a drain current of the FET 605 increases depending on the driving time of the FET 605, the peak value of the drain current of the FET 605 can be lowered by shortening the driving time of the FET 605. As a consequence, a driving frequency can be made high when the switching power supply is in the intermittent oscillation state, so that the sound in the audible range generated by the transformer 604 can be reduced.

[FB Terminal Voltage and Comparative Voltage Supply]

The FB terminal voltage value of the control IC 607, which is a condition that the control IC 607 performs transition to the intermittent oscillation state, and the voltage value of the comparative voltage supply 105 have variations. Accordingly, the FB terminal voltage value and the voltage value of the comparative voltage supply 105 do not necessarily match each other. When these two voltage values are different from each other, a secondary-side output voltage transitionally has a fluctuation. However, automatic correction through the shunt regulator 612 is immediately applied, so that the output voltage is immediately stabilized. That is, in the switching power supply illustrated in FIG. 1, feedback control is also performed to control the output voltage Vcc to be constant as illustrated in FIG. 5A. Accordingly, the accuracy of the output voltage Vcc is not deteriorated by the variations in the FB terminal voltage value of the control IC 607 and in the voltage value of the comparative voltage supply 105. The accuracy of the output voltage Vcc is dependent on the accuracy of the shunt regulator 612 and the resistors 613 and 614.

For example, assume that the intermittent oscillation state is asserted on the condition that the FB terminal voltage of the control IC is 0.5V and the voltage of the comparative voltage supply 105 is 0.6V. In this case, the control IC 607 is not in the intermittent oscillation state, so that control by the comparator 101 is effective. Once the control by the comparator 101 is started, the turn-on time (equivalent to the time B) of the FET 605 is shortened to narrow the peak value of the drain current. Since the same energy still needs to be fed in this state, the driving frequency of the FET 605 rises. This may involve a slight fluctuation in the output voltage. However, even when the output voltage is fluctuated, the fluctuation is immediately fed back as the FB terminal voltage via the shunt regulator 612 as described in the foregoing. As a result, the output voltage is corrected in an instant and stabilized to be a predetermined voltage.

Consider a case where, contrary to the above case, the condition of the FB terminal voltage of the control IC 607 is 0.5V and the comparative voltage supply 105 is 0.4V, i.e., a case where the voltage value of the comparative voltage supply 105 is lower than the FB terminal voltage. Under this condition, the output voltage may also slightly be fluctuated. However, as described above, the correction through the shunt regulator 612 is immediately started, so that the output voltage is corrected in an instant and is stabilized to be the predetermined voltage. Moreover, in the case of this condition, the FB terminal voltage is in a load range which essentially requires a countermeasure against the sound in the audible range (also referred to as sound generation) generated from the transformer 604. Unfortunately, the countermeasure is not taken in this case. However, the intermittent oscillation state in this case is a state on the verge of transiting to the continuous oscillation state, and in this intermittent state, the switching operation scarcely stops. In the case of such intermittent oscillation, the frequency of the intermittent oscillation is high, so that its frequency rarely enters into the audible range. Therefore, a jarring sound (sound included in the audible range generated from the transformer 604) is not heard, and therefore the FB terminal voltage value and the voltage value of the comparative voltage supply 105 may have variations. Accordingly, the FB terminal voltage supply and the comparative voltage supply 105 of the control IC 607 may also be set different from each other.

In the present embodiment as described in the foregoing, the voltage of the comparative voltage supply 105 which is used as an intermittent oscillation condition and the FB terminal voltage of the control IC 607 are compared with the comparator 101. Depending on the comparison result, a predetermined current flows to the resistors 616 and 617 which are connected to the IS terminal. As a consequence, an ascent rate of the IS terminal voltage of the control IC 607 is increased so that the driving time of the FET 605 can be shortened. The same effect can be obtained when the comparative voltage supply 105 used as an intermittent oscillation condition and the IS terminal voltage are compared with the comparator 101.

According to the present embodiment as described in the foregoing, the sound in the audible range generated from the transformer while the switching power supply is in the intermittent oscillation state can be reduced.

Embodiment 2

Figure 3A:
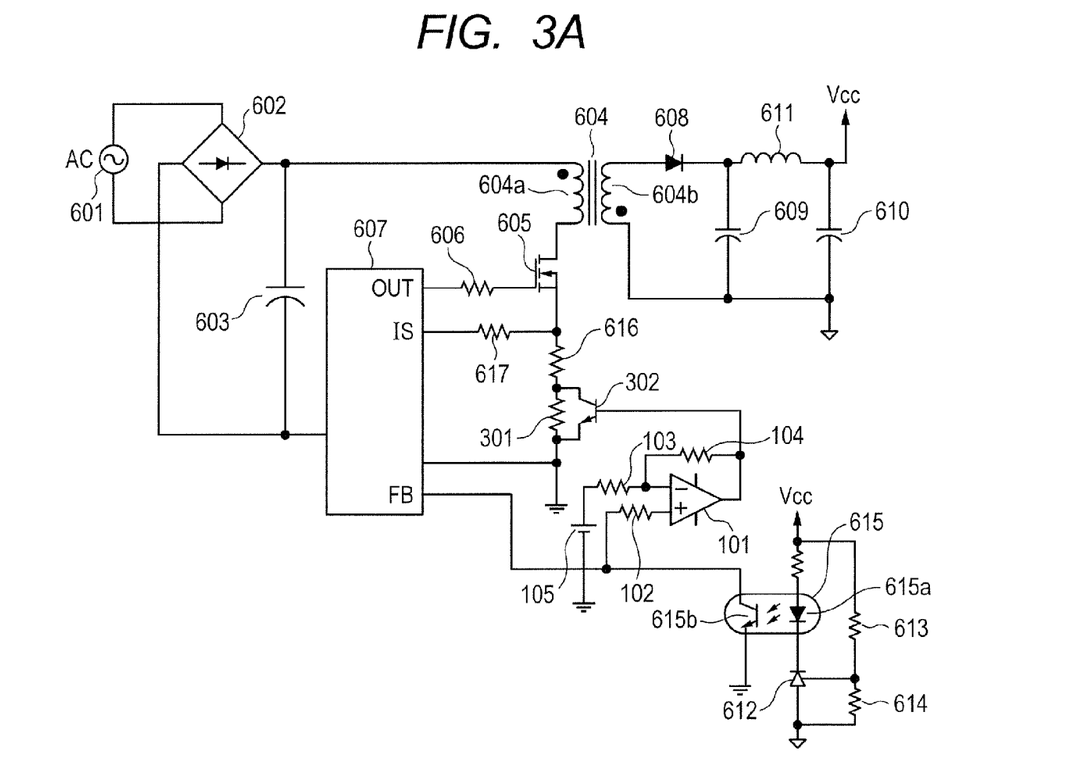
FIG. 3A is a circuit diagram of a switching power supply of an embodiment 2.

The embodiment 1 is configured so that the voltage of the comparative voltage supply 105 which is used as an intermittent oscillation condition and the FB terminal voltage are compared with the comparator 101 and a predetermined current flows to the resistor connected to the IS terminal depending on the comparison result. Accordingly, in the embodiment 1, the ascent rate of the IS terminal voltage is increased so as to control the driving time of the FET 605 to be shortened. In the embodiment 2, a resistor which is a current detection resistor is made up of two resistors connected in series. The first resistor is a resistor 616 and the second resistor is a later-described resistor 301. Depending on the comparison result of the comparator 101, resistance values of the current detection resistor are switched by a later-described transistor 302. With this configuration, the driving time of the FET 605 is controlled to be shortened in the present embodiment.

[Switching Power Supply]

Figure 3B:
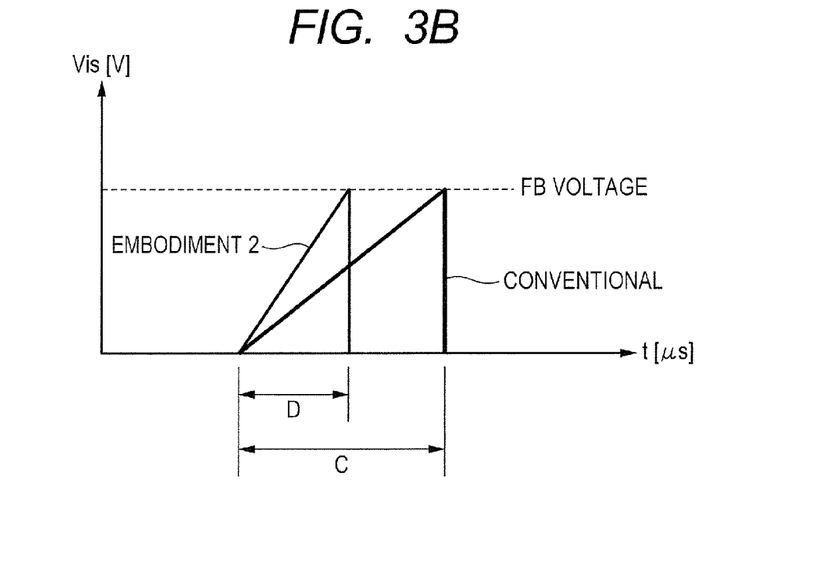
FIG. 3B illustrates the waveform of the IS terminal voltage.

FIG. 3A is a circuit diagram of a switching power supply that is a power supply apparatus of the present embodiment. FIG. 3B illustrates an operation waveform of the switching power supply. The component members identical to those in FIG. 1 are designated with identical reference numerals to omit a description thereof. The resistor 301 is a second current detection resistor. The resistor, which should essentially include one resistor, includes two resistors, the resistor 616 and the resistor 301. The resistor 616 and the resistor 301 are connected in series. An npn transistor (hereinbelow simply referred to as a transistor) 302 is connected in parallel to the resistor 301. More specifically, a collector terminal of the transistor 302 is connected to a junction point (one end of the resistor 301) between the resistor 616 and the resistor 301, while an emitter terminal of the transistor 302 is connected to the other end of the resistor 301. Since the transistor 302 is connected in parallel to the resistor 301, the resistor 301 is short-circuited when the transistor 302 is turned on. As a result, only the resistor 616 is present as a current detection resistor. When the transistor 302 is turned off, a series combined resistor made up of the resistor 616 and the resistor 301 functions as a current detection resistor.

In normal load operation, the series combined resistor made up of the resistor 616 and the resistor 301 is configured to have a small value since a large drain current needs to be flown through the FET 605. In light load operation, the series combined resistor made up of the resistor 616 and the resistor 301 is configured to have a large value so as to shorten the driving time of the FET 605 by increasing an apparent voltage value input into the FB terminal of the control IC 607.

In the switching power supply configured in this way, the value of a voltage input into the FB terminal of the control IC 607 is sufficiently larger than the voltage value used as an intermittent oscillation condition in a normal load state, so that the output of the comparator 101 is at a high level. When the output of the comparator 101 is at the high level, the transistor 302 is turned on and the resistor 301 is short-circuited. Accordingly, only the resistor 616 functions as a current detection resistor, so that the series combined resistor value of the current detection resistor is decreased. As a result, a large load can be supported.

Meanwhile, when the value of the voltage input into the FB terminal of the control IC 607 becomes smaller than the voltage value of the comparative voltage supply 105, that is, when the switching power supply is in the intermittent oscillation state, the output of the comparator 101 is at a low level. When the output of the comparator 101 is at the low level, the transistor 302 is turned off. Accordingly, the resistor formed by serially connecting the resistor 301 and the resistor 616 functions as a current detection resistor. As a result, the series combined resistor made up of the resistor 616 and the resistor 301 serves as a current detection resistor, so that the resistor value becomes large. If the same resistance value is set for the resistor 616 and the resistor 301, the combined resistance value becomes twice the set resistance value, depending on whether the transistor 302 is turned on or off. Thus, in the present embodiment, the resistance value (the first resistance value) of the resistor 616, and the combined resistance value (the second resistance value larger than the first resistance value) of the resistor 616 and the resistor 301 are switched depending on the normal load state and the intermittent oscillation state. Accordingly, it can also be said that the present embodiment is configured to include a switch unit that performs switching operation to shorten the turn-on time of the FET 605 when the switching power supply transits from the continuous oscillation state to the intermittent oscillation state. Here, the switch unit includes the comparator 101 and the transistor 302.

[Effect of Switching Resistance Values of Current Detection Resistor]

The operation waveform of FIG. 3B illustrates how the waveform of an IS terminal voltage of the control IC 607 changes depending on whether the transistor 302 is turned on or off. Since FIG. 3B is similar to FIG. 2, a description thereof is omitted. Time C represents a period of time taken for the IS terminal voltage of the control IC 607 to reach an FB voltage when the transistor 302 is turned on, i.e., when the current detection resistor includes only the resistor 616 (when the combined resistance value is small). It can also be said that the waveform of a voltage Vis corresponding to the time C is equivalent to the waveform when the conventional switching power supply described in FIG. 5A is in the intermittent oscillation state. Time D represents a period of time taken for the IS terminal voltage of the control IC 607 to reach the FB voltage when the transistor 302 is turned off, i.e., when the current detection resistor includes the resistor 616 and the resistor 301 connected in series (when the combined resistance value is large). The resistance value of the current detection resistor in time D is larger than that in time C. Accordingly, in the case of the time D, a voltage rise per unit time becomes large, so that inclination of the voltage rise is increased. In this case, if the same drain current flows and two current detection resistors, the resistor 616 and the resistor 301, have the same resistance values, then the time taken for the IS terminal voltage of the control IC 607 to reach the FB terminal voltage is reduced generally to half by ON-OFF control of the transistor 302. Thus, in the intermittent oscillation state, the transistor 302 is turned off, so that the combined resistance value of the resistor 616 and the resistor 301 is increased. As a result, the turn-on time of the FET 605 becomes equal to the time D which is shorter than the time C. Consequently, the sound generated from the transformer 604 in the intermittent oscillation state can be dislocated from the audible range.

In the present embodiment as described in the foregoing, the voltage of the comparative voltage supply 105 which is used as an intermittent oscillation condition and the FB terminal voltage are compared with the comparator 101, and the transistor 302 is turned on or off depending on the comparison result, so that switching control of the resistance values of the current detection resistor is performed. At the time when the control IC 607 starts the intermittent oscillation state, the control IC 607 sets the resistance value of the current detection resistor to be high. As a result, the ascent rate of the IS terminal voltage of the control IC 607 can be increased so that the driving time of the FET 605 can be shortened. The present embodiment is configured such that the resistor 616 and the resistor 301 are connected in series and the transistor 302 is connected in parallel to one of the resistors. However, the same effect can be obtained when the resistor 616 and the resistor 301 are connected in parallel and the transistor 302 is connected to one of the resistor 616 and the resistor 301 in series.

According to the present embodiment as described in the foregoing, the sound in the audible range generated from the transformer while the switching power supply is in the intermittent oscillation state can be reduced.

Embodiment 3

In the embodiments 1 and 2, transition of the control IC 607 to the intermittent oscillation state is determined by monitoring the FB terminal voltage of the control IC 607 with the comparator 101. In the intermittent oscillation state, the FET 605 is uniformly controlled to have a narrowed turn-on width. Since control to narrow the turn-on width of the FET 605 leads to a higher driving frequency of the FET 605 as described above, which causes a switching loss to be increased. In these days, it is pursued to minimize power consumption of electronic apparatuses in an idle state as close to zero watt as possible. Accordingly, it is desirable to avoid increase in switching loss of the FET 605 in the idle state.

Accordingly, in the present embodiment, control of narrowing the turn-on width of the FET 605, which is a countermeasure against the sound generation by the transformer 604, is stopped when the electronic apparatus enters into the idle state. The idle state of the electronic apparatus is equivalent to a sleep mode of the electronic apparatus in FIG. 5B.

[Switching Power Supply]

Figure 4A:
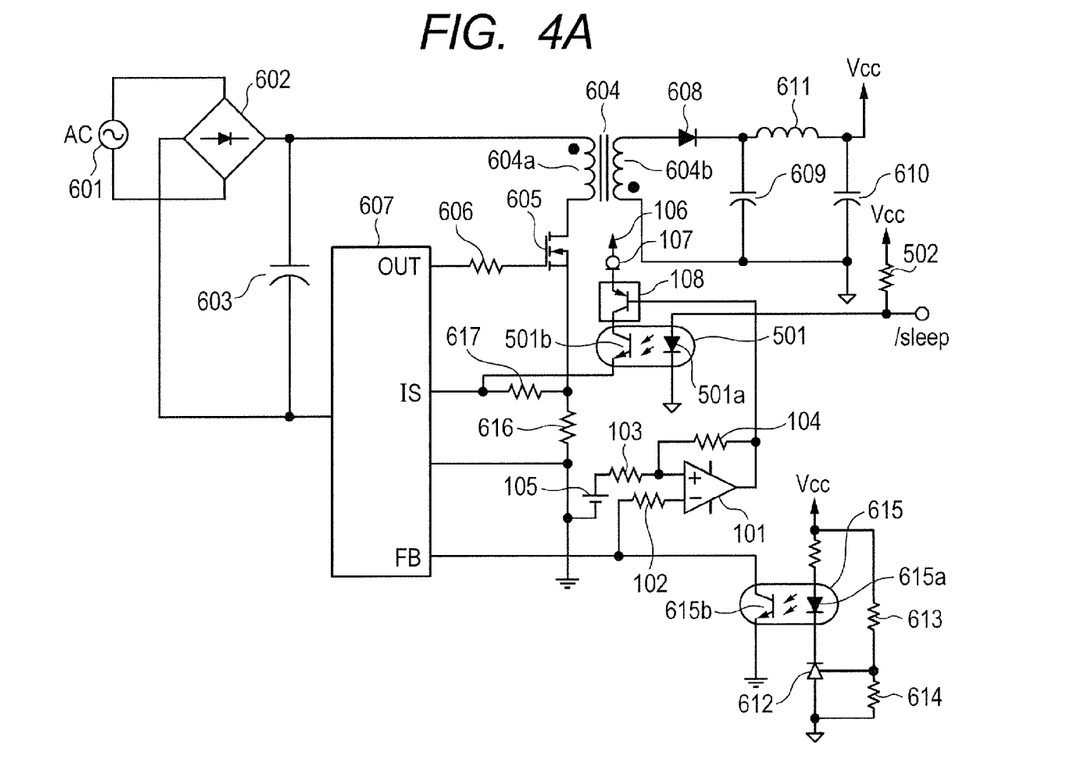

FIG. 4A is a circuit diagram of a switching power supply that is a power supply apparatus of the present embodiment. The component members identical to those in FIG. 1 are designated with identical reference numerals to omit a description thereof. In a photo coupler 501, a collector terminal of a photo-transistor 501b is connected to a collector terminal of a transistor 108 while an emitter terminal of the photo-transistor 501b is connected to an IS terminal of the control IC 607. In the photo coupler 501, a cathode terminal of a light emitting diode 501a is connected to a ground while an anode terminal is connected to a power supply voltage Vcc via a pull-up resistor 502. A signal indicating that the electronic apparatus is in the idle state (hereinafter referred to as a /sleep signal) is input to the anode terminal of the light emitting diode 501a in the photo coupler 501 from an unillustrated CPU included in an electronic apparatus. The /sleep signal notifies that the electronic apparatus has transited to the sleep mode. In this case, the unillustrated CPU is equivalent to, for example, an engine controller when the electronic apparatus is an image forming apparatus. As described in the foregoing, the idle state is equivalent to the sleep mode described in FIG. 5B. Accordingly, in the present embodiment, when the switching power supply is in the intermittent oscillation state, and the electronic apparatus is in the standby mode, control (hereafter referred to as a control on the sound generation countermeasure) is executed to shorten the turn-on time of the FET 605 so as to reduce the sound generated from the transformer 604. When the switching power supply is in the intermittent oscillation state and the electronic apparatus has transited to the sleep mode, the control on the sound generation countermeasure is stopped and priority is given to control (hereafter referred to as low power consumption control) to reduce power consumption.

In the switching power supply configured in this way, a high-level /sleep signal is output from the CPU when the electronic apparatus is not in the idle state, i.e., when the electronic apparatus is in the operation mode or in the standby mode. As a consequence, the photo-transistor in the photo coupler 501 is turned on. Accordingly, the current from the constant current supply 107 constantly flows as a countermeasure against sound generation by the transformer 604. That is, when the switching power supply is in the intermittent oscillation state and the electronic apparatus is not in the idle state, priority is given to control on the countermeasure against sound generation by the transformer 604. Once the electronic apparatus goes into the idle state, the CPU notifies that the electronic apparatus goes into the idle state by outputting the /sleep signal to the switching power supply. Here, the CPU outputs a low-level /sleep signal in the idle state. When the /sleep signal output from the CPU of the electronic apparatus is at the low level, the photo coupler 501 is turned off and the current from the constant current supply 107 is blocked. That is, as described in the embodiment 1, transition of the comparator 101 to the intermittent oscillation state is detected by monitoring the FB terminal voltage of the control IC 607. Even when correction of the IS terminal voltage is attempted (even when increment of the IS terminal voltage Vis is attempted), the attempt is blocked. Thus, once the electronic apparatus goes into the idle state (sleep mode), priority is given to the low power consumption control rather than the control on the sound generation countermeasure even when the switching power supply is in the intermittent oscillation state.

In the present embodiment as described in the foregoing, the voltage of the comparative voltage supply 105 which is used as an intermittent oscillation condition and the FB terminal voltage are also compared with the comparator 101. Depending on the comparison result, a predetermined current flows to the resistors 616 and 617 which are connected to the IS terminal. As a consequence, an ascent rate of the IS terminal voltage of the control IC 607 is increased so that the driving time of the FET 605 can be shortened. When the electronic apparatus goes into the idle state, the CPU of the electronic apparatus outputs the /sleep signal so as to notify the switching power supply of the transition to the idle state. This prevents control of narrowing the turn-on width of the FET 605 from being performed. As a result, control can be executed to ensure reduction in power consumption while the electronic apparatus is in the idle state. Therefore, it can be said that the photo coupler 501 functions as an approval unit that approves or disapproves switching operation (the control on the sound generation countermeasure) to shorten the turn-on time of the FET 605 in response to the /sleep signal input from the outside.

In the present embodiment, propriety (approval or disapproval) of executing the turn-on width control of the FET 605 is determined based on the /sleep signal in the configuration wherein the comparator 101 compared the voltage of the comparative voltage supply 105 and the FB terminal voltage and the predetermined current flows through the resistors 616 and 617 depending on the comparison result. The same effect may also be obtained in the configuration where the comparator 101 compares the comparative voltage supply 105 and the IS terminal voltage.

The same effect may also be obtained in the configuration where the predetermined current does not flow through the resistors 616 and 617 depending on operation of the comparator 101 but the resistors 616 and 301 are connected in series or in parallel and the resistance values of the combined resistor are switched as in the embodiment 2. For example, in the case where the resistor 616 and the resistor 301 are connected in series or in parallel as in the embodiment 2, the following configuration may be adopted. That is, the resistor 301 may be connected in parallel or in series to a photo-transistor 501b side of the photo coupler 501, whose light emitting diode 501a is connected to the /sleep signal in the present embodiment. Moreover, for example, the photo-transistor 501b side of the photo coupler 501 in the present embodiment may be connected between the base terminal of the transistor 302 and the output terminal of the comparator 101. When the electronic apparatus is not in the sleep mode based on the /sleep signal, the combined resistance value of the resistor 616 and the resistor 301 is made switchable to allow the control on the sound generation countermeasure to be implemented. When the electronic apparatus is put in the sleep mode based on the /sleep signal, the combined resistance value of the resistor 616 and the resistor 301 is made unswitchable, so that the priority is given to the low power consumption control rather than the control on the sound generation countermeasure. Thus, in the circuit configuration of the embodiment 2, the switching power supply can be notified of the transition of the electronic apparatus to the idle state (sleep mode).

According to the present embodiment as described in the foregoing, the sound in the audible range generated from the transformer while the switching power supply is in the intermittent oscillation state can be reduced.

Embodiment 4

The power supply apparatuses described in the embodiments 1 to 3 are applicable to, for example, low voltage power supplies of the image forming apparatuses, i.e., power supplies that supply power to controllers (control units) and drive units such as motors. The configuration of an image forming apparatus with the power supply apparatuses of the embodiments 1 to 3 applied thereto will be described below.

[Configuration of Image Forming Apparatus]

Figure 4B:
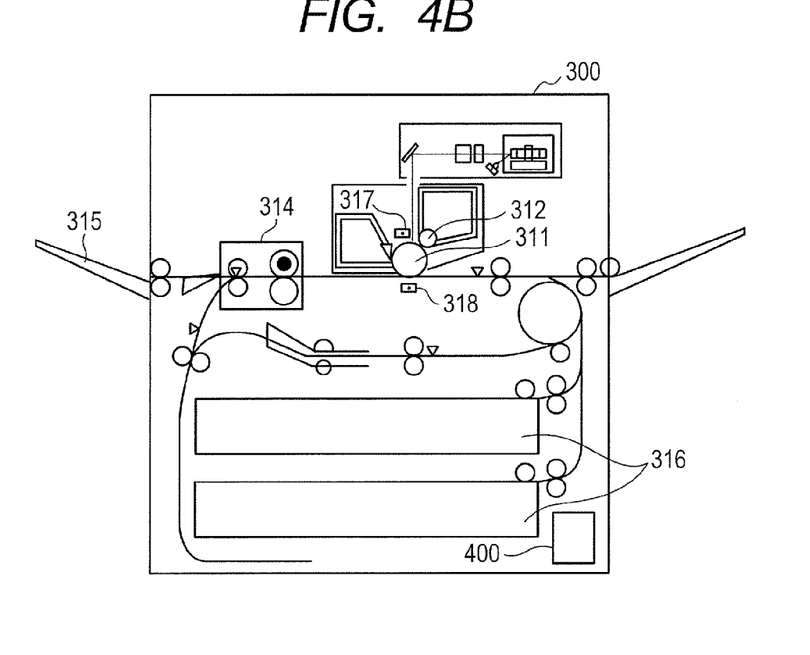
FIG. 4B is a block diagram of an image forming apparatus of an embodiment 4.

As an example of the image forming apparatuses, a laser beam printer will be described. FIG. 4B illustrates the schematic configuration of a laser beam printer as an example of an electrophotographic printer. A laser beam printer 300 includes a photoconductor drum 311 as an image carrier on which an electrostatic latent image is formed, a charging section 317 (charging unit) that uniformly charges the photoconductor drum 311, and a developing section 312 (developing unit) that develops the electrostatic latent image formed on the photoconductor drum 311 with toner. A toner image developed on the photoconductor drum 311 is transferred by a transfer section 318 (transfer unit) to a sheet (not illustrated) used as a recording material supplied from a cassette 316. The toner image transferred to the sheet is fixed by a fixing device 314 and is ejected to a tray 315. An image forming unit comprises the photoconductor drum 311, the charging section 317, the developing section 312, and the transfer section 318. The laser beam printer 300 also includes a power supply apparatus 400 described in the embodiments 1 to 3. The image forming apparatus with the power supply apparatus 400 according to the embodiments 1 to 3 applicable thereto is not limited to the one illustrated in FIG. 4B. For example, the power supply apparatus 400 may also be applied to an image forming apparatus having a plurality of image forming unit. The image forming apparatus may further include a primary transfer section that transfers the toner image on the photoconductor drum 311 to an intermediate transfer belt, and a secondary transfer section that transfers the toner image on the intermediate transfer belt to a sheet.

The laser beam printer 300 includes an unillustrated controller that controls image forming operation by the image forming unit and sheet conveying operation. The power supply apparatus 400 according to the embodiments 1 to 3 feeds electric power to, for example, the controller. The power supply apparatus 400 according to the embodiments 1 to 3 feeds electric power to a driving unit such as motors that drive various rollers that rotate the photoconductor drum 311 or convey a sheet. That is, the load in the embodiments 1 to 3 is equivalent to the controller and/or the drive unit.

The image forming apparatus of the present embodiment may operate in a normal operation mode that executes image forming operation (equivalent to the operation mode of FIG. 5B in the normal load operation), a stand-by mode that is a standby state which implements power saving and in a sleep mode that is an idle state. That is, the image forming apparatus of the present embodiment can operate in the normal operation mode as a first mode that performs image formation and in the stand-by mode as a second mode that is lower in power consumption than the normal operation mode and that is to stand by for image formation. Furthermore, the image forming apparatus of the present embodiment can operate in the sleep mode as a third mode that is lower in power consumption than the stand-by mode and that is to stop operation. During the stand-by mode and the sleep mode, the image forming apparatus of the present embodiment can reduce the load and thereby reduce power consumption. That is, in the image forming apparatus of the present embodiment, the power supply apparatus 400 described in the embodiments 1 to 3 performs intermittent oscillation operation during the stand-by mode (in the case of a particularly light load) and the sleep mode. When the power supply apparatus 400 performs intermittent oscillation operation, the sound generation (the sound in the audible range) generated from the transformer 604 of the power supply apparatus 400 can be reduced by the configuration described in the embodiments 1 to 3. Furthermore, when the image forming apparatus has transited to the sleep mode, the power supply apparatus 400 of the embodiment 3 does not perform the control on the sound generation countermeasure. As a result, further reduction in power consumption can be achieved.

According to the present embodiments as described in the foregoing, the sound in the audible range generated from the transformer while the switching power supply is in the intermittent oscillation state can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-245244, filed Nov. 27, 2013, which is hereby incorporated by reference herein in its entirety.

What is claimed is:

1. A power supply apparatus, comprising:
   a transformer having a primary winding on a primary side and a secondary winding on a secondary side;
   a switching element configured to performs switching operation to turn on or turn off a current flowing in the primary winding;
   a feedback unit configured to output a voltage corresponding to a voltage generated in the secondary winding;
   a conversion unit configured to convert the current flowing in the primary winding of the transformer into a voltage;
   a control unit configured to control operation of the switching element based on the voltage output by the feedback unit and the voltage output from the conversion unit; and
   a voltage switching unit configured to increase the voltage output from the conversion unit and supply the increased voltage to the control unit, when the switching element is transited from a continuous oscillation state to an intermittent oscillation state, the continuous oscillation state causing the switching element to continuously oscillate in a predetermined cycle, the intermittent oscillation state causing the switching element to intermittently oscillate in a cycle longer than the predetermined cycle.

2. A power supply apparatus according to claim 1, wherein the voltage switching unit detects transition to the intermittent oscillation state based on the voltage output by the feedback unit and adds a predetermined voltage to the voltage outputs from the conversion unit.

3. A power supply apparatus according to claim 2, comprising a constant current supply,
   wherein the voltage switching unit adds the predetermined voltage by supplying a current from the constant current supply to the conversion unit.

4. A power supply apparatus according to claim 3,
   wherein the voltage switching unit includes a transistor connected between the constant current supply and the conversion unit, and
   wherein the transistor is turned off in the continuous oscillation state and turned on in the intermittent oscillation state.

5. A power supply apparatus according to claim 1,
   wherein the conversion unit has a resistor switchable between a first resistance value and a second resistance value larger than the first resistance value, and
   wherein the voltage switching unit detects transition to the intermittent oscillation state based on the voltage output from the feedback unit and switches the resistance value of the resistor in the conversion unit from the first resistance value to the second resistance value so as to shorten the turn-on time.

6. A power supply apparatus according to claim 5,
   wherein the resistor has a first resistor and a second resistor connected in series to the first resistor,
   wherein the voltage switching unit includes a transistor connected to the second resistor in parallel, and
   wherein the transistor is turned on in the continuous oscillation state and turned off in the intermittent oscillation state.

7. A power supply apparatus according to claim 1,
   wherein the voltage switching unit compares the voltage output by the feedback unit and a predetermined threshold value, and detects transition to the intermittent oscillation state when the voltage output by the feedback unit is less than the predetermined threshold value.

8. A power supply apparatus according to claim 7, wherein the predetermined threshold value is equal to a predetermined value.

9. A power supply apparatus according to claim 7, wherein the predetermined threshold value is different from a predetermined value.

10. A power supply apparatus according to claim 1, comprising an approval unit that approves or disapproves switching operation performed by the voltage switching unit to shorten the turn-on time in response to a signal input from an outside.

11. An image forming apparatus comprising:
    an image forming unit that forms an image; and
    a power supply that supplies electric power to the image forming apparatus,
    wherein the power supply includes:
    a transformer having a primary winding on a primary side and a secondary winding on a secondary side;
    a switching element configured to performs switching operation to turn on or turn off a current flowing in the primary winding;
    a feedback unit configured to output a voltage corresponding to a voltage generated in the secondary winding;
    a conversion unit configured to convert the current flowing in the primary winding of the transformer into a voltage;
    a control unit configured to control operation of the switching element based on the voltage output by the feedback unit and the voltage output from the conversion unit; and
    a voltage switching unit configured to increase the voltage output from the conversion unit and supply the increased voltage to the control unit, when the switching element is transited from a continuous oscillation state to an intermittent oscillation state, the continuous oscillation state causing the switching element to continuously oscillate in a predetermined cycle, the intermittent oscillation state causing the switching element to intermittently oscillate in a cycle longer than the predetermined cycle.

12. An image forming apparatus according to claim 11,
wherein the continuous oscillation state is a first mode that causes the image forming unit to execute image formation,
wherein the intermittent oscillation state is a second mode that does not cause the image forming unit to execute image formation, and
wherein a power consumption in the second mode is lower than a power consumption in the first mode.

13. An image forming apparatus according to claim 12, comprising a controller configured to control operation of the image forming unit,
wherein when a mode of the image forming apparatus is transited from the first mode to the second mode that is lower in power consumption than the first mode, the controller outputs a signal to notify that a mode of the image forming apparatus is transited to the second mode to the power supply, and
wherein when the signal is input into the control unit from the controller, the voltage switching unit switches to prevent the voltage output from the conversion unit from increasing.

\* \* \* \* \*